April 3, 1934.  J. M. HOTHERSALL  1,953,079
APPARATUS FOR MAKING POURING SPOUTS
Filed Oct. 18, 1930  11 Sheets-Sheet 1

INVENTOR
John M. Hothersall
BY
John C. Carpenter
ATTORNEY

April 3, 1934.  J. M. HOTHERSALL  1,953,079
APPARATUS FOR MAKING POURING SPOUTS
Filed Oct. 18, 1930  11 Sheets-Sheet 2
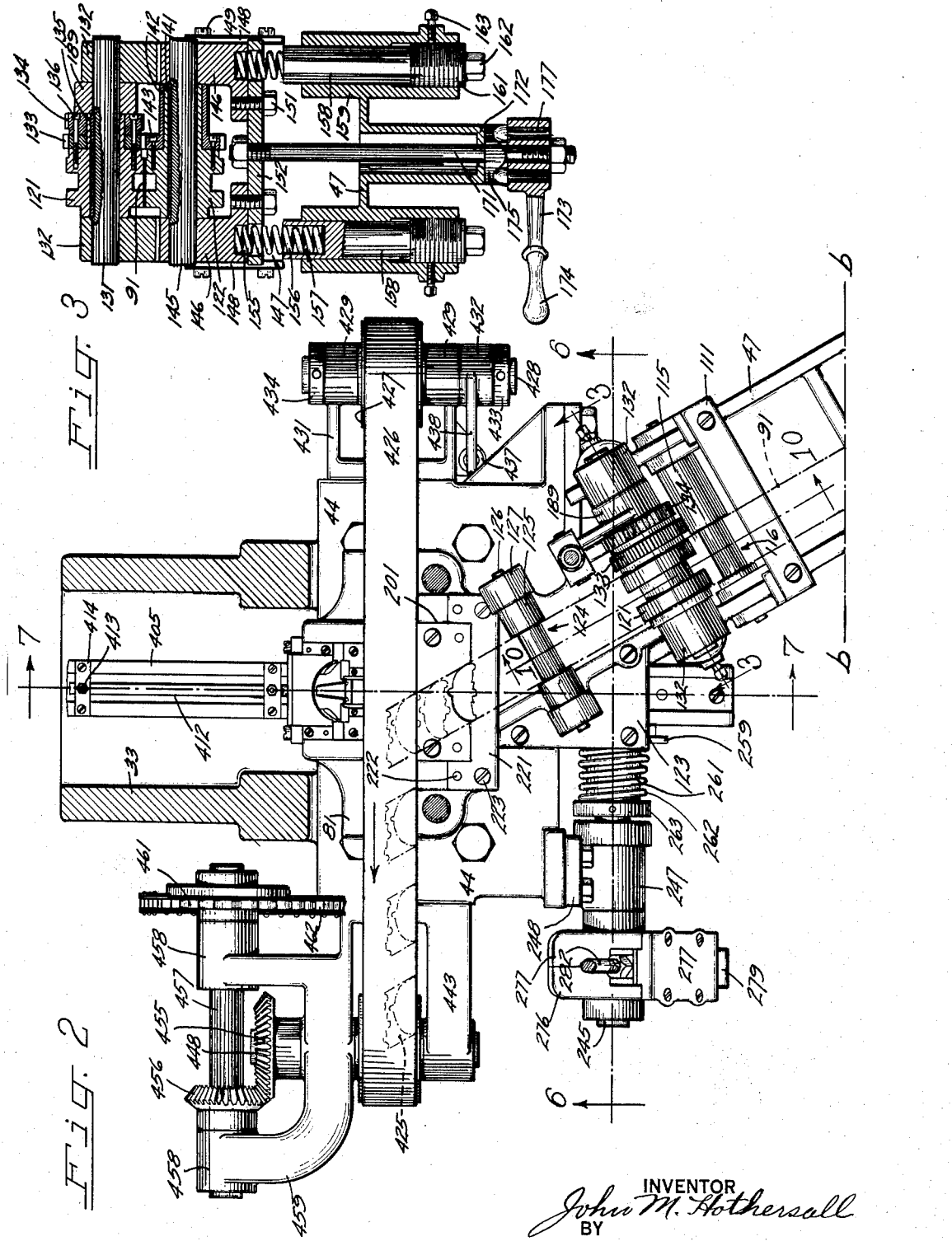
INVENTOR
John M. Hothersall
BY
John C. Carpenter
ATTORNEY

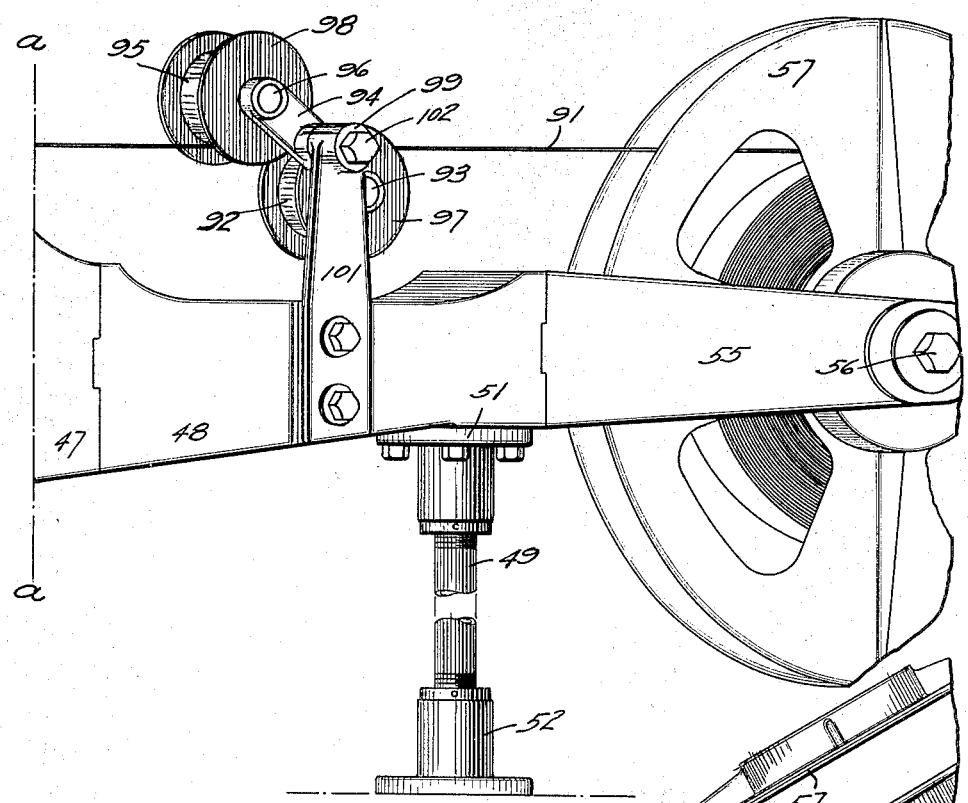
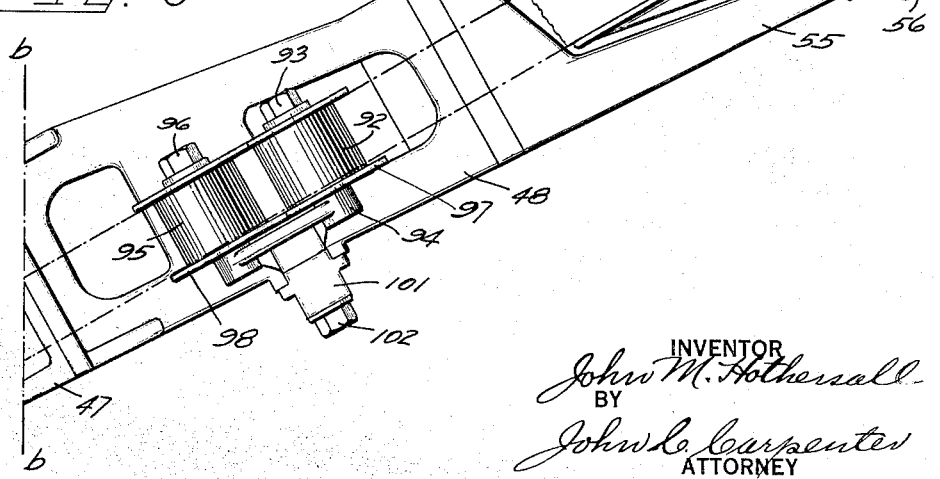

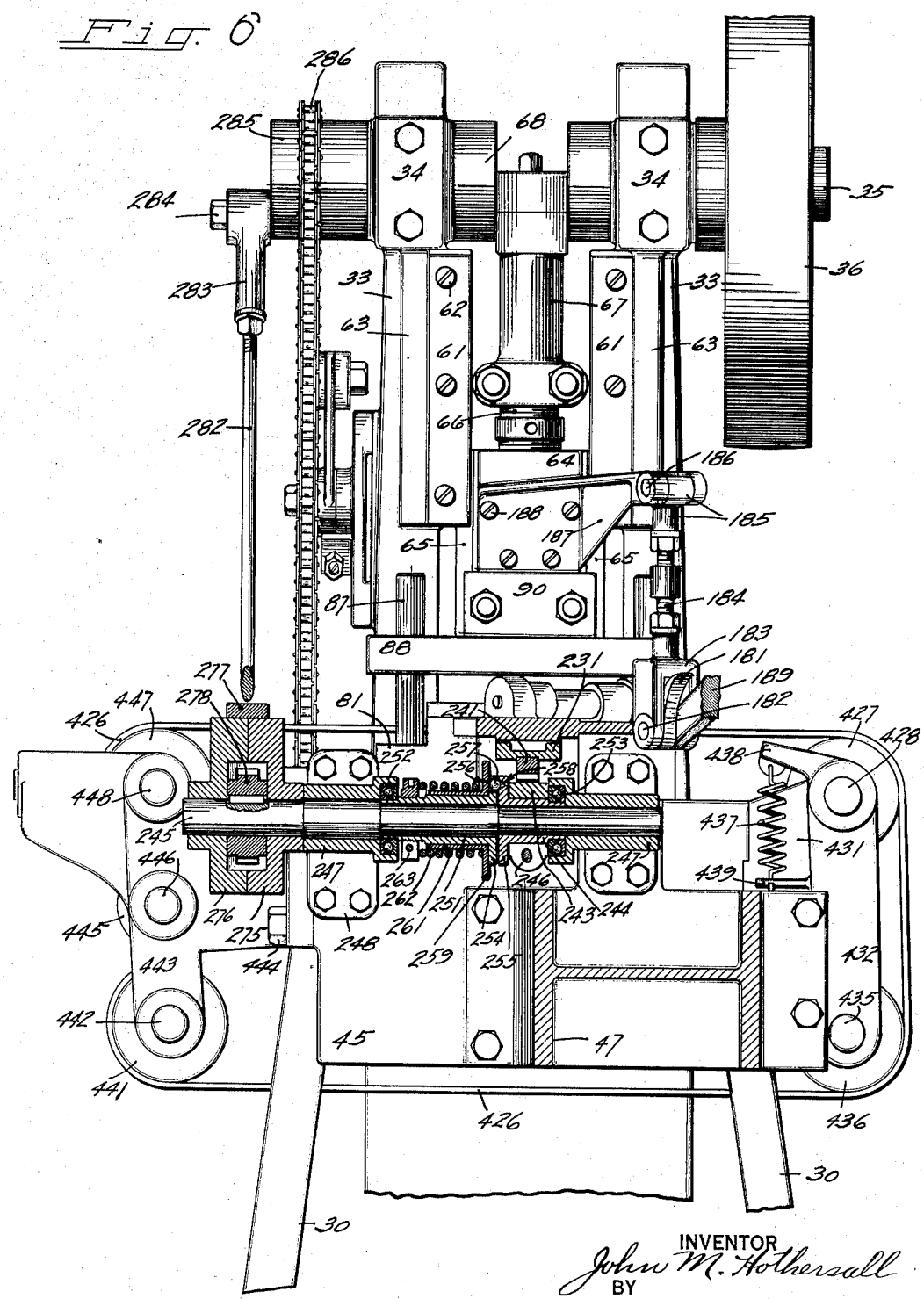

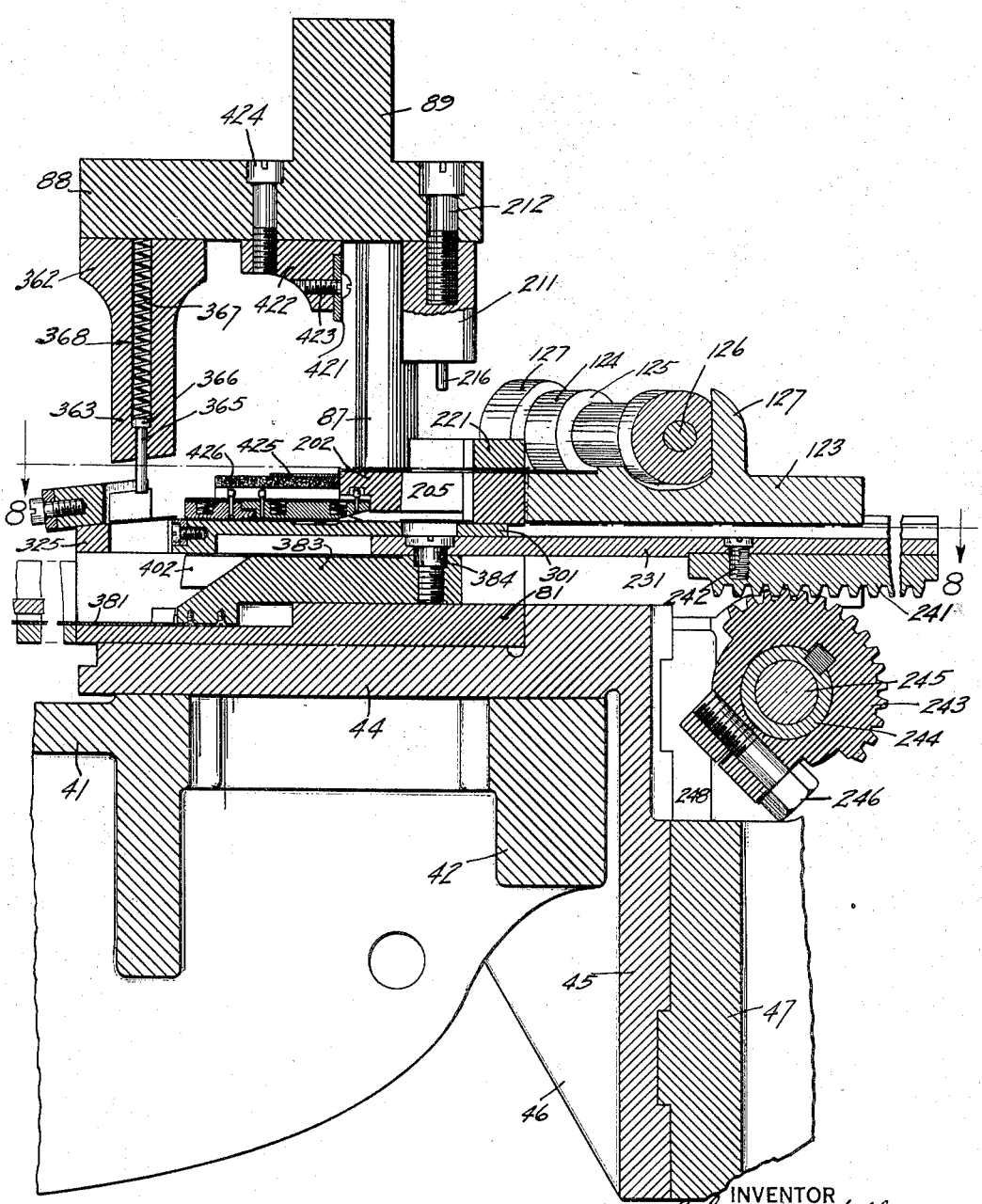

April 3, 1934.  J. M. HOTHERSALL  1,953,079
APPARATUS FOR MAKING POURING SPOUTS
Filed Oct. 18, 1930   11 Sheets-Sheet 6
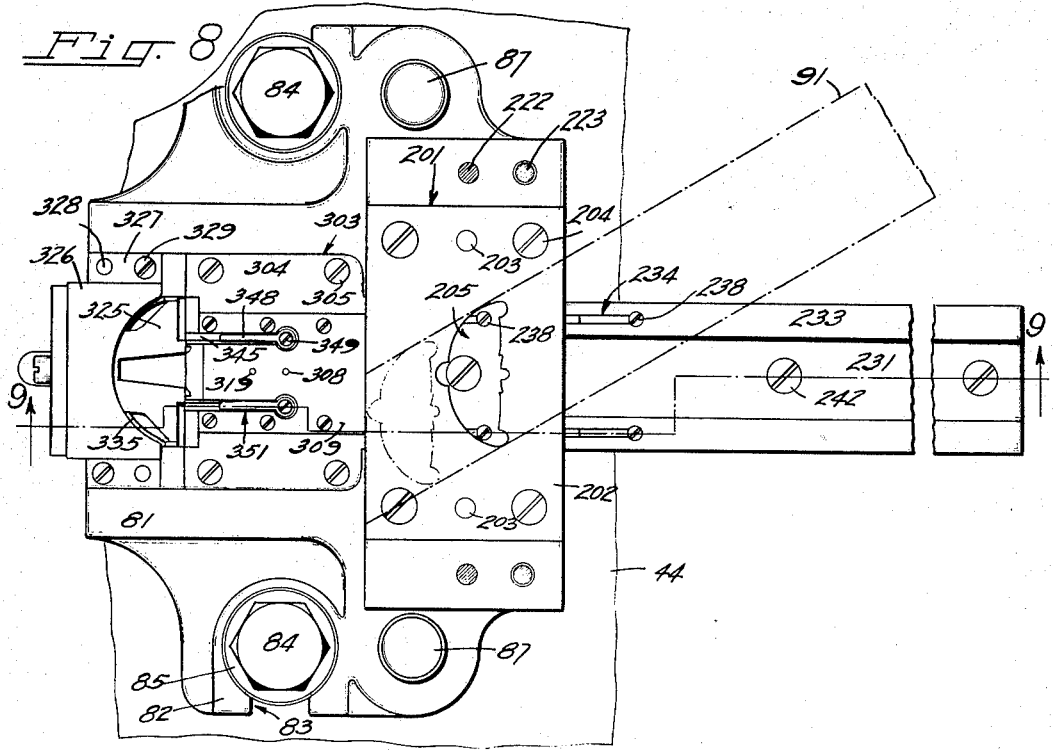
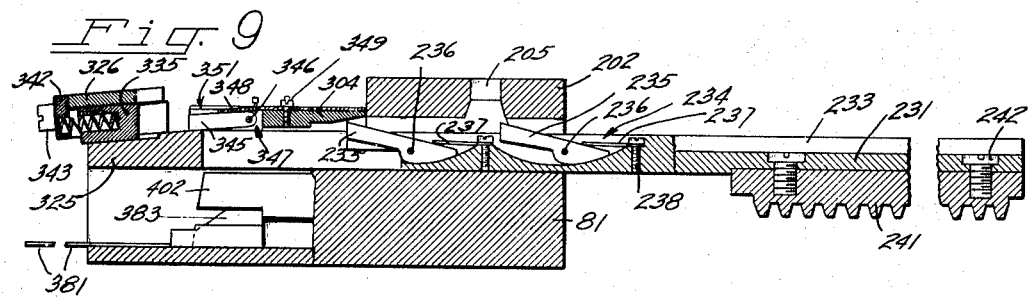
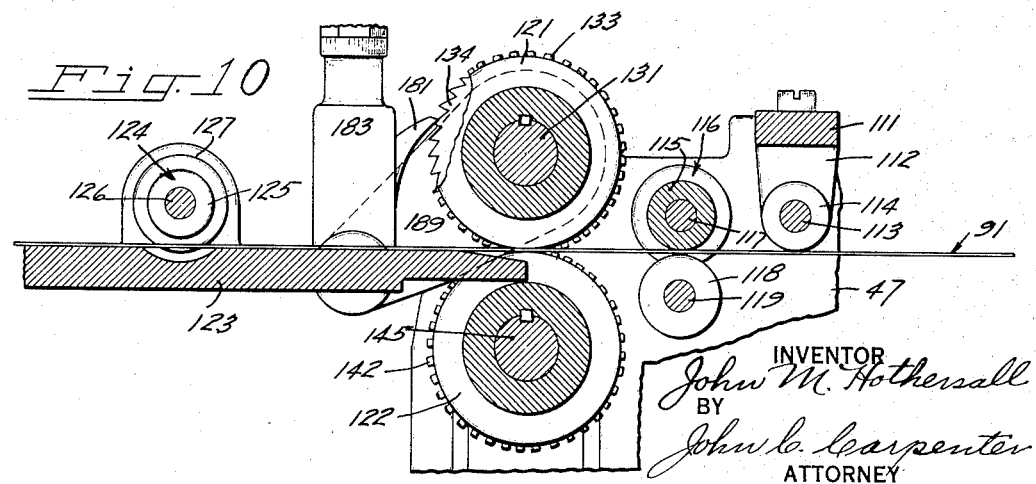
INVENTOR
John M. Hothersall
BY
John C. Carpenter
ATTORNEY

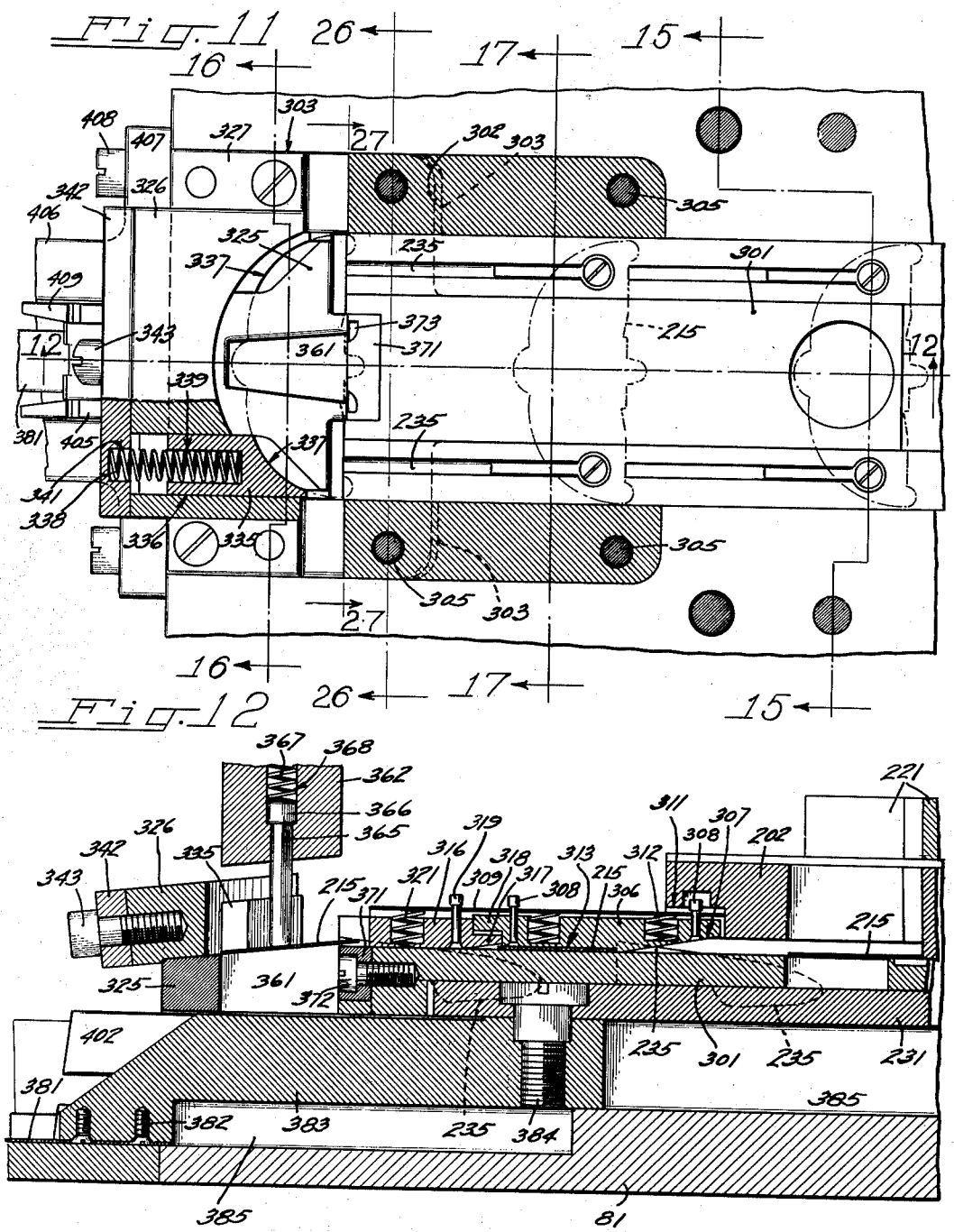

April 3, 1934.     J. M. HOTHERSALL     1,953,079
APPARATUS FOR MAKING POURING SPOUTS
Filed Oct. 18, 1930     11 Sheets-Sheet 8
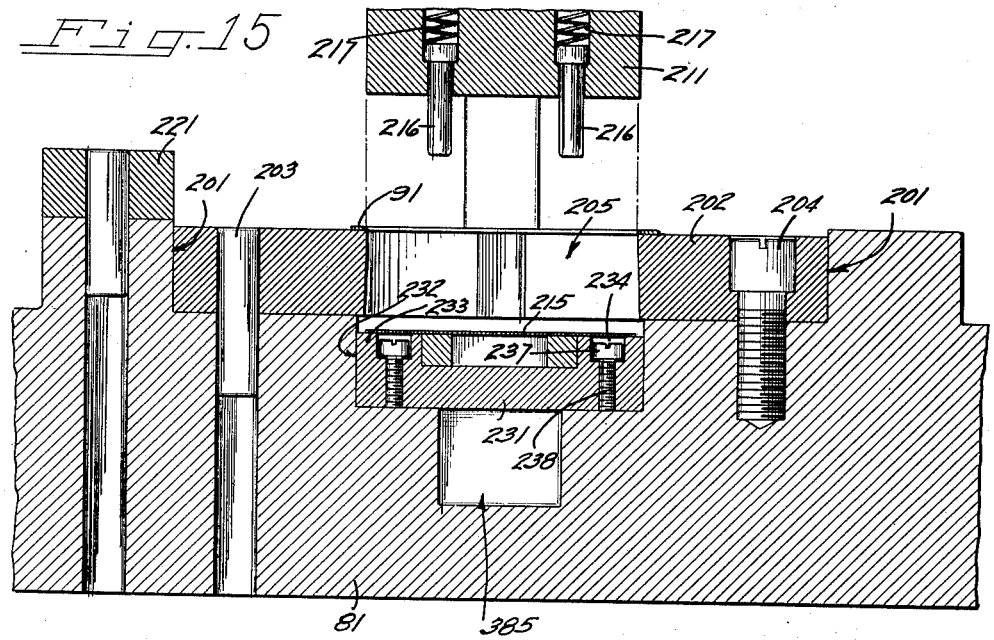
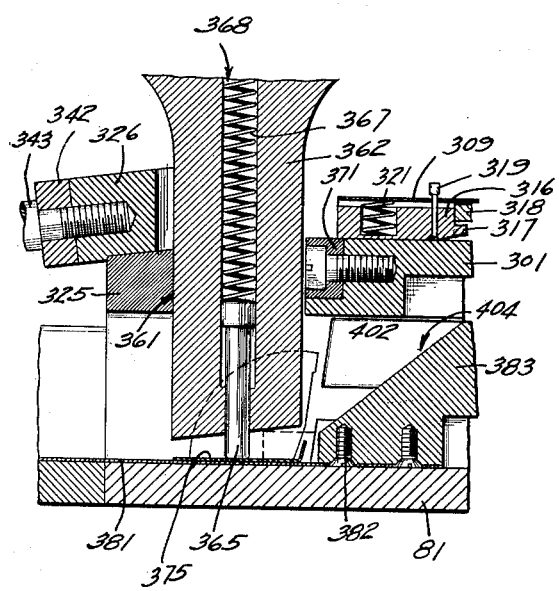
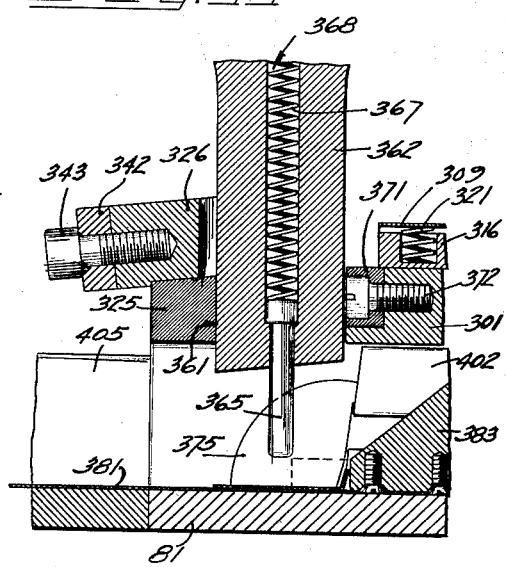
INVENTOR
John M. Hothersall
BY
John C. Carpenter
ATTORNEY April 3, 1934.　　J. M. HOTHERSALL　　1,953,079
APPARATUS FOR MAKING POURING SPOUTS
Filed Oct. 18, 1930　　11 Sheets-Sheet 9

INVENTOR
John M. Hothersall
BY
John C. Carpenter
ATTORNEY

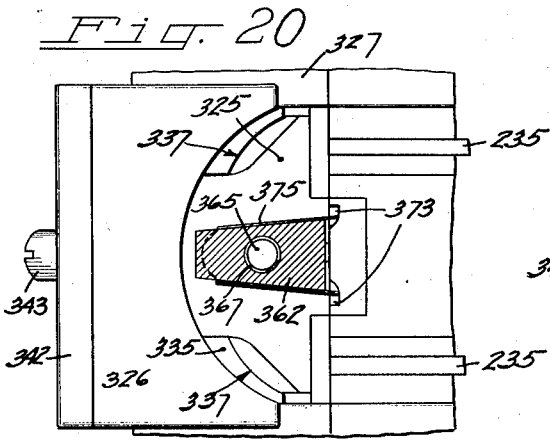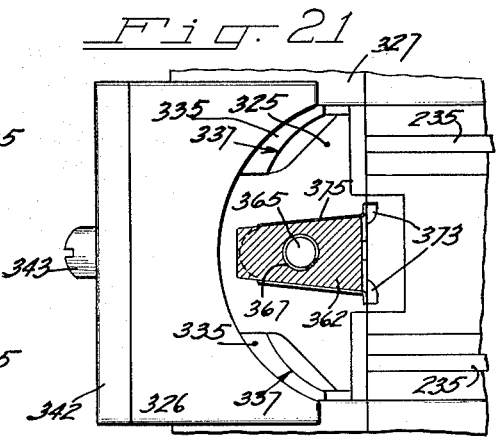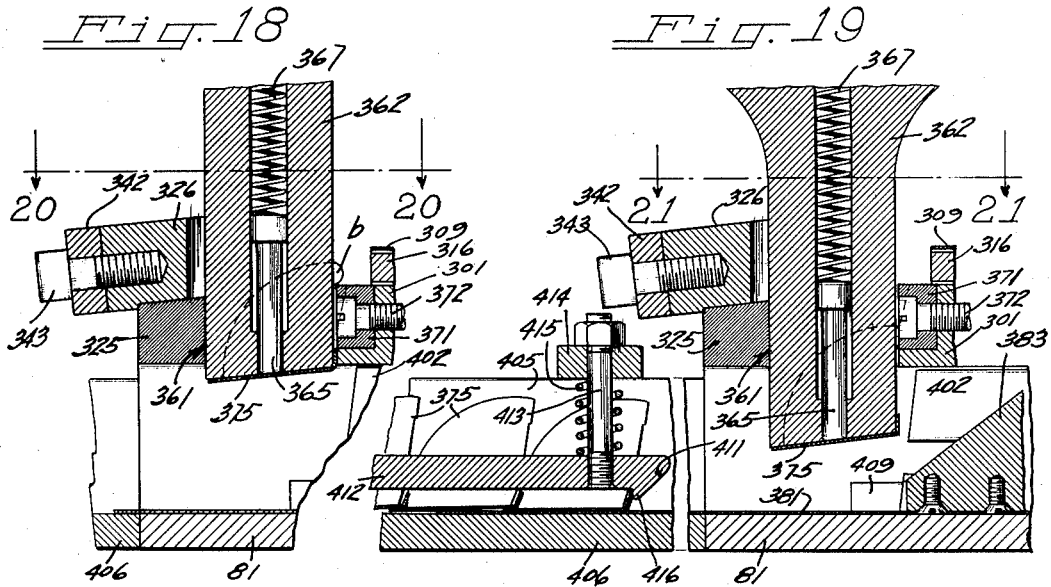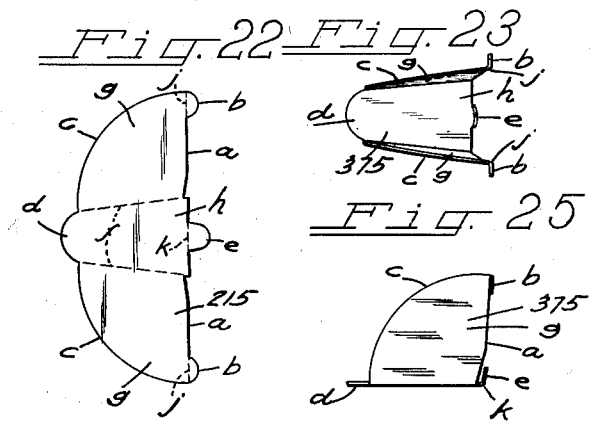

April 3, 1934.  J. M. HOTHERSALL  1,953,079
APPARATUS FOR MAKING POURING SPOUTS
Filed Oct. 18, 1930  11 Sheets-Sheet 11

INVENTOR
John M. Hothersall
BY
John C. Carpenter
ATTORNEY

Patented Apr. 3, 1934

1,953,079

UNITED STATES PATENT OFFICE 1,953,079

APPARATUS FOR MAKING POURING SPOUTS

John M. Hothersall, Brooklyn, N. Y., assignor to American Can Company, New York, N. Y., a corporation of New Jersey Application October 18, 1930, Serial No. 489,526

9 Claims. (Cl. 113—1)

The present invention relates to machines for making pouring spouts and has particular reference to cutting and forming a spout from sheet material.

The principal object of the present invention is the provision of a machine which automatically feeds a strip of sheet material through a series of operating stations, first, removing a spout blank from the strip and then bending and forming it into pouring spout shape.

An important object of the invention is the provision of an apparatus for blanking or cutting a spout from sheet material and feeding the blank into a station where it is accurately centered prior to a bending and forming operation.

An important object of the invention is the provision of feeding devices for a spout making apparatus wherein a strip of sheet material is advanced intermittently into a blanking or cutting station and wherein feeding of the strip may be interrupted without stopping the other parts of the machine.

An important object of the invention is the provision of an apparatus for feeding a strip of sheet material from a continuous reel and blanking and forming spouts while automatically disposing of the skeleton strip produced by removal of the spout blanks from the strip.

A further important object of the invention is the provision of an apparatus for feeding spout blanks into a bending and shaping station and controlling such feeding action to prevent damage to the machine in the event of improper feeding conditions.

Numerous other objects of the invention will be apparent as it is better understood from the following description, which, taken in connection with the accompanying drawings, discloses a preferred embodiment thereof.

Referring to the drawings:

Fig. 2 is a plan sectional view taken substantially along the line 2—2 in Fig. 1;

Fig. 3 is a transverse sectional detail of the strip feeding rollers and associated parts being taken substantially along the line 3—3 in Fig. 2;

Fig. 4 is an end elevation of the strip reel end of the machine, Figs. 1 and 4 fitting together along the broken vertical lines a—a, shown in the two figures, to complete the end elevation of the entire machine;

Fig. 5 is a plan view of that part of the apparatus disclosed in Fig. 4, this figure fitting together with Fig. 2 along the broken lines b—b, shown in the two figures, to complete the plan of the entire machine;

Fig. 6 is a front elevation, partly in section of the apparatus, being viewed along the line 6—6 in Fig. 2;

Fig. 7 is an enlarged sectional view taken substantially along the line 7—7 in Fig. 2, parts being broken away;

Fig. 8 is a sectional plan view of some of the stationary die parts of the apparatus being taken substantially along the line 8—8 in Fig. 7;

Fig. 9 is a transverse sectional detail taken substantially along the broken line 9—9 in Fig. 8;

Fig. 10 is an enlarged sectional view taken along the line 10—10 in Fig. 2;

Fig. 11 is an enlarged plan view, partly in section of the stationary die parts illustrated on the left-hand side of Fig. 8;

Fig. 12 is a sectional view taken substantially along the line 12—12 in Fig. 11;

Fig. 13 is a fragmentary sectional view of the mechanism shown on the left-hand side of Fig. 12, parts being shown in a different position;

Fig. 14 is a view similar to Fig. 13, parts being shown in yet another position;

Fig. 15 is a transverse sectional view taken substantially along the broken line 15—15 in Fig. 11;

Fig. 18 is a sectional view similar to Fig. 13 illustrating movable parts thereof in a different position;

Fig. 19 is a view similar to Fig. 13 illustrating the parts in still another position;

Fig. 20 is a plan sectional detail taken along the line 20—20 in Fig. 18;

Fig. 21 is a plan sectional detail taken along the line 21—21 in Fig. 19;

Fig. 22 is a face view of the spout blank;

Fig. 23 is an underside view of the completed spout;

Fig. 24 is an end view of the spout;

Fig. 25 is a side view of the spout;

Figure 1:
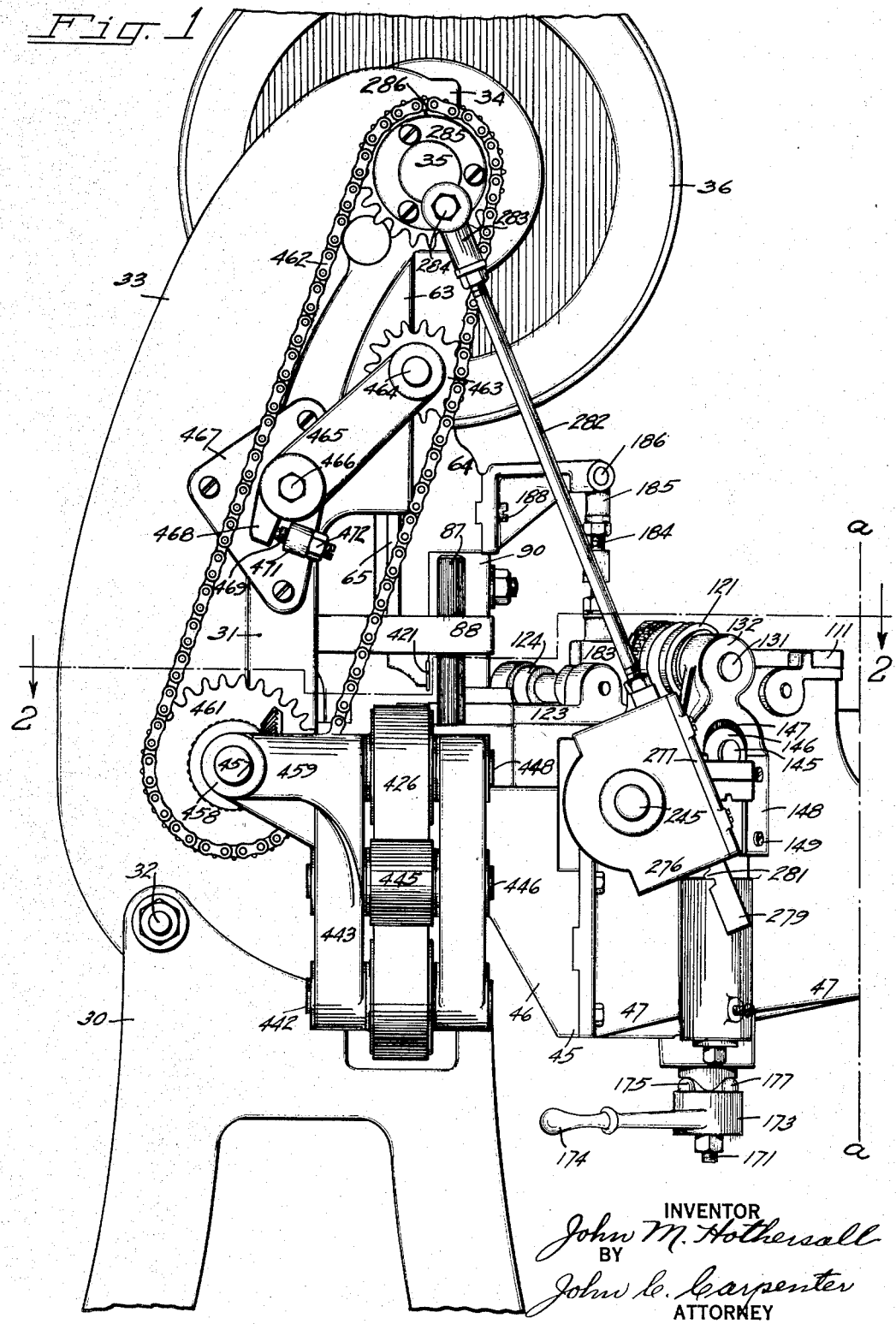
Figure 1 is an end elevation of the principal part of an apparatus adapted to the manufacture of pouring spouts according to the present invention.

The apparatus of the present invention contemplates, as an initial step, the automatic feeding of a strip of sheet material into a blanking or cutting station. This material is supplied in reel form and is unwound from the reel and intermittently advanced by feeding rollers. The principal supporting parts of the apparatus are formed as frame members of a punch press on which is mounted the other mechanisms.

As the strip, in its passage through the machine, is brought to rest at the blanking station, movable die members mounted on a press slide cooperate with certain stationary blanking dies at the blanking station and cut or sever a spout blank from the strip, forcing it downwardly through the stationary dies and onto a sliding part which constitutes an element in a transferring device. This transferring device has intermittent movement and advances the blank step by step from the blanking station, through an idle station and into a spout forming or bending station. A safety clutch control regulates proper operation of the transferring device.

In the spout forming or bending station, the blank is accurately centered relative to cooperating dies and is bent into spout form by being forced downwardly through a female stationary forming die. It is positioned onto a discharge support by the moving die parts.

The skeleton end of the strip, after the spout blanks are removed, passes into a device which cuts off the end of the skeleton. The severed scrap is then conveyed from the machine by means of a discharge belt.

A typical shape of spout to be formed in the apparatus of the present invention is arbitrarily selected to exemplify the various operations of the apparatus and this spout is formed from a blank having a shape illustrated in Fig. 22. Such a blank is provided with a substantially straight edge $a$, connecting with semi-circular lugs $b$ formed at the ends of the straight edge. The lugs $b$ extend into rounded edges $c$ which come together in a semi-circular nose $d$. A central lug $e$ is formed at the center of the straight side $a$ of the blank. The mechanism at the forming station of the present apparatus bends the blank along the dotted lines $f$ producing side walls $g$ and a central section $h$. This mechanism also bends the lugs $b$ substantially at right angles along the dotted lines $j$ and the lug $e$ along the dotted line $k$. This will be further set forth in the description that follows.

The apparatus is supported upon legs 30 (Fig. 1) which carry a press frame 31 pivotally mounted at 32 in the usual manner. The press frame comprises spaced side walls 33 (Fig. 6) in the upper parts of which are formed bearings 34 in which a crankshaft 35 is journaled. A belt pulley 36 is mounted on the shaft and receives power in any suitable manner.

The side walls 33 are joined by a web 41 (Fig. 7) which connects with a horizontal section 42. This part of the frame supports a bolster or bolster plate from which is carried a large part of the apparatus. This bolster is formed as a table or bed 44 which rests directly on the press frame and projects downwardly along its front edge as a bracket wall 45. The wall 45 is reinforced by ribs 46.

A bracket 47 is connected at one end, to the wall 45 and at the opposite end to an intermediate bracket 48 which is supported upon a column 49 resting on the floor (Fig. 4), this column having an upper collar 51 and a foot 52 joined by an adjustable pipe section. The bracket 48 supports an end bracket 55 (see also Fig. 5) which carries a bolt 56 on which a reel 57 is or may be mounted. The reel 57 contains the supply of sheet material which, as disclosed, is in the form of a continuous strip.

The side walls 33 of the press carry vertically extending slide gibs 61 (Fig. 6) secured by screws 62 to extensions 63 (see also Fig. 1) projecting forwardly from the side walls 33. The gibs 61 provide slideways for a vertically movable press slide 64 provided with laterally extending walls 65 which move within the slideways of the gibs 61 in the usual press manner. The press slide 64 is adjustably connected by a threaded member 66 to a pitman 67 which extends over a crank 68 formed in the crankshaft 35.

Stationary die parts associated with the various stations of the apparatus are supported by and mounted upon the table 44 and associated movable die members are carried by the slide 64. The stationary die parts are mounted upon a die shoe 81 (Figs. 2, 8, 11 and 12) which is bolted to the table 44. This die shoe is formed with spaced extensions 82 slotted at 83 to accommodate bolts 84 which threadedly engage in the table 44, the head of each bolt tightly clamping against a washer 85 resting against the upper face of the die shoe. The slots allow for adjustment of the die shoe in its position on the table to properly align the stationary die members with the movable die members carried by the slide.

The die shoe 81 carries a pair of pilot posts 87 (Figs. 6, 7 and 8) which form guides for the press slide 64. For this purpose the slide 64 carries at its lower end a punch block 88 having a stem 89 clamped in the press slide 64 by a clamping plate 90. The punch block 88 is formed with suitable vertical openings through which the pilot posts 87 extend, the latter guiding the punch block, and certain parts carried thereby, in accurate alignment with the die parts carried on the die shoe 81.

The first operating station, which is the blanking station and at which a blank is severed from the strip of sheet material, is located toward the front of the table 44 and at the open side of the press frame. The strip of sheet material, designated by the numeral 91, (Figs. 2, 3 and 4) passes diagonally through this station being unwound from the reel 57 and guided between a lower roller 92 (see also Fig. 5) rotatably mounted on a stud 93 carried on one arm of a lever 94 and an upper roller 95 rotatably mounted on a stud 96 carried on another arm of the lever 94.

The rollers 92 and 95 are respectively provided with flanges 97 and 98 which guide the strip 91 in its proper path of travel. The lever 94 is mounted on the upper end of a bracket 101 bolted to one side of the bracket 48. The lever 94 may be shifted pivotally of the bracket 101 and may then be clamped in proper position by a bolt 102 passed through the bracket and threadedly engaged in the lever 94. This adjustment of the lever 94 regulates the positions of the rollers 92 and 95 for proper guiding action on the strip 91.

The strip 91 (Figs. 2, 3 and 10) passes between spaced walls of the bracket 47 and under bar 111 secured to the upper walls of the bracket. The bar 111 carries downwardly extending arms 112 which support a stationary shaft 113 on which rotates a roller 114. The roller 114 engages the upper surface of the strip 91 and holds it in proper horizontal position.

The strip 91, between the roller 114 and the other parts of the apparatus, passes under an upper guide roller 115, which is reduced in diameter throughout part of its length, to provide an annular groove 116 in which the strip 91 moves.

The roller 115 turns freely on a horizontal shaft 117 carried by the side walls of the bracket 47. A lower roller 118 is loosely mounted on a horizontal shaft 119 also carried by the side walls of the bracket and this extends into the groove 116 and cooperates with the roller 115 to properly guide the strip at this point.

The strip thence passes between an upper feed roller 121 and an associated lower feed roller 122 positioned beneath. Intermittent movement of these rollers 121 and 122 draw the strip 91 from the reel 57 and move it over the upper surface of a plate 123 (Figs. 1, 7 and 10) mounted on the table 44. The strip, advancing over the plate 123, is further guided by a roller 124 having a peripheral groove 125 in which the strip is located. This roller 124 rotates on a horizontal shaft 126 supported in lugs 127 projecting upwardly from the plate 123.

The upper feed roller 121 is keyed to a horizontal shaft 131 (see also Fig. 3) supported in bearings 132 formed in the side walls of the bracket 47. A gear 133 and a ratchet wheel 134 are mounted on a tubular extension 135 of the roller 121 and are secured to the roller by screws 136.

The lower roller 122 is provided with a tubular extension 141 on which is mounted a gear 142, which meshes with the gear 133 of the roller 121. The gear 142 is secured to the roller 122 by screws 143. This gear connection between the rollers 121 and 122 insures uniform rotation of the rollers. The roller 122 is keyed to a horizontal shaft 145 which is rotatably mounted in spaced dolly boxes 146 (see also Fig. 1), each box having vertical movement within a slot 147 formed in the side walls of the bracket 47 directly beneath the bearing 132.

These dolly boxes are slidably retained within their slots 147 by side plates 148 secured by screws 149 to the walls of the bracket 47. The boxes 146 are connected by bolts 151 to a horizontal strap 152, the strap and the two boxes moving as a unit. Each dolly box 146 and strap 152 is recessed at 155 to accommodate the upper end of a spring 156 which extends into a recess 157 formed in the upper end of a spring barrel 158 located in a tubular boss 159 formed in each side wall of the bracket 47.

Each spring barrel 158 is held in an adjusted vertical position by a threaded plug 161 which has a bolt head 162 to permit turning, the plug having threaded engagement within the lower end of the tubular boss 159. Turning of the plug 161 within its threaded seat raises and lowers the spring barrel 158 resting thereon and this changes the compression upon the spring 156 associated therewith. After each plug 161 has been brought into proper adjusted position, it is locked in place by a set-screw 163 threadedly engaging within its tubular boss. The strip 91 is thus yieldingly and frictionally engaged between the rollers 121 and 122.

Provision is made for manually separating the feed rollers 121 and 122 to permit insertion of a new strip 91 into the apparatus or to stop feeding of the strip without stopping the other operations. For this purpose, a vertically extending rod 171 has threaded connection with the strap 152, its lower end passing through a tubular bearing 172 formed in the bracket 47. The lower end of the rod 171 is threadedly secured to a handle lever 173 (see also Fig. 1) which has a manipulating hand grip 174 by which the lever and the rod may be turned. A cam 175 is held in fixed position on the lower end of the tubular part 172 and is provided with an undulating cam surface.

A pair of pins 177 having rounded heads are inserted in the lever 173 and are held at all times by means of the springs 156, against the lower face of the cam 175. In one position of the handle lever 173 (as shown in Figs. 1 and 3) the depressed parts of the undulating face of the cam 175 engage the heads of the pins 177 and when in this position the strap 152 is in its uppermost position, this being the operating position for the feeding rollers 121 and 122.

As the handle lever 173 is moved through ninety degrees, the heads of the pins 177 ride upon the protruding parts of the face of the cam 175 and the handle lever, the strap 152, boxes 146 together with the shaft 145 and the roller 122 are moved downwardly compressing the springs 156 and separating the rollers 121 and 122.

The upper roller 121 is turned in one direction through a limited number of degrees by means of a ratchet device operating in connection with the ratchet wheel 134. Reference should be had to Figs. 1, 6 and 10, which disclose a ratchet pawl 181 pivoted on a horizontal shaft 182 carried in a block 183 connected by means of an adjustable connecting rod 184 with a block 185 pivoted at 186 to a bracket 187 secured by screws 188 to the face of the press slide 64. The shaft 182 is carried by an arm 189 which encircles the shaft 131 and is located between the ratchet wheel 134 and one of bearings 132.

As the slide 64 is lowered, the block 183 is correspondingly lowered and the arm 189, freely turning on the shaft 131 carries the ratchet pawl 181 in a counterclockwise direction (Fig. 10). In this movement the ratchet pawl, pivoting on its shaft 182, moves freely over the ratchet teeth of the ratchet wheel without affecting it. As the slide 64 moves upwardly on its return stroke, the pawl 181 is correspondingly raised and, engaging with the teeth of the ratchet wheel 134, causes the latter to move in a clockwise direction, this movement effecting a corresponding partial movement and rotation of the feed roller 121. The roller 122 is correspondingly moved, in a counterclockwise direction and the strip 91 frictionally engaged between the rollers is advanced in its step movement.

The strip 91, after passing over the horizontal surface of the plate 123, comes into the blanking station. In this station the die shoe 81 is grooved at 201 (Figs. 8 and 15) and a die plate 202 is seated therein. Dowel pins 203 passing through the plate 202 and the shoe 81 assist in centering these parts relative to each other and screws 204 passing through the plate 202 and threadedly engaging the shoe 81 clamp the plate 202 securely in position.

The die plate 202 is cut through by a vertical opening 205 of the shape of the blank disclosed in Fig. 22, the top edge of the walls of this opening forming the cutting edge for the blanking operation. The strip 91, as it comes to rest in this station, lays over the upper surface of the die plate 202 and over the opening 205 as illustrated in Figs. 7 and 8.

The punch block 88 adjacent one edge, carries a blanking punch member 211 secured to the punch block 88 by bolts 212. The punch 211 is of the same shape and configuration as the opening 205 and is in direct vertical alignment therewith. As the press slide 64 is moved downwardly this blanking punch engages the strip 91 and, cooperating with the cutting edge walls of the opening 205, severs a spout blank 215 (Figs. 15 and 22) from the strip.

Pins 216 (Figs. 7 and 15) are preferably mounted in the punch 211 and normally project below the face thereof, being yieldingly held by springs 217 embedded in the punch member in the usual or a preferred manner. These pins, during the blanking stroke, engage the upper surface of the strip 91 and hold it firmly in position until the punch comes into blanking position, the springs yielding to permit this movement.

The punch member 211 passes into the opening 205 and forces the formed blank 215 through this opening. The walls of the opening 205 are preferably tapered as shown in Fig. 15 and the formed blank 215 falls by gravity after being freed from frictional contact with the upper part of the walls of the die opening. The blank 215 thus comes into position on a transferring device which removes it from the blanking station.

As the press slide 64 returns on its upward stroke, the punch 211 is withdrawn from the strip 91 which, at such time, is held against upward movement by a stripper plate 221 (Figs. 2, 12 and 15). This stripper plate is supported on the die shoe 81 and extends across and above the line of travel of the strip 91 at this station. Its lower face is spaced above the upper face of the die plate 202 to permit unrestricted passage of the strip. The stripper plate 221 is held in place at its two ends by dowel pins 222 and bolts 223.

The transferring device on which the severed blank 215 falls, comprises a sliding member 231 (Figs. 6, 8, 9, 12 and 15) which at its forward end has sliding movement within a channel 232 cut longitudinally of the die shoe beneath the groove 201 thereof. This sliding member 231 is U-shape in cross section having raised sides 233. The forward end of each side 233 is slotted at 234 and feed dogs 235 (Fig. 9) are pivotally mounted in these slots. Each dog has pivotal movement on a pin 236 embedded in the sliding member 231, there being two feed dogs 235 and two slots 234 on each side.

The feed dogs are normally held in raised position (as illustrated in Fig. 9) by leaf springs 237 secured to the slide member 231 by screws 238, both the spring and the head of the screw of each set being located within the groove 234. It is on the upper surface of the raised sides 233 (Fig. 15) that the spout blank 215 falls as previously described. The member 231 at such time is in its backward position with the rear pair of feed dogs 235 just back of the blank.

The sliding member 231 is moved back and forth within its channel 232, to effect the transfer of the blank from station to station, by a mechanism connecting with the crankshaft 35. This connection is not direct, however, a safety clutch control being interposed between certain actuating parts connecting with the crankshaft and other actuated parts associated directly with the feeding member. This will now be described.

The sliding member 231 extends outwardly beyond the die shoe and, at its outer end, carries a rack section 241 (Figs. 7 and 9) connected therewith by screws 242. The teeth of this rack section mesh with a segmental gear 243 (Fig. 7) keyed to a sleeve 244 loosely mounted on a horizontal shaft 245 (see also Fig. 6). A clamping nut 246 holds the segmental gear 243 in position on its sleeve 244.

The shaft 245 is oscillated in bearings 247 formed in brackets 248 bolted to the bracket wall 45. The shaft 245 also carries a tubular member 251 (Fig. 6) which is keyed thereto and which is located between one of the bearings 247 and the end of the sleeve 244. This member 251 is associated with a ball thrust bearing 252 located in one of the bearings 247 and a similar ball thrust bearing 253 is used between the other bearing 247 and the sleeve 244. These bearings hold the shaft 245 centralized.

The tubular member 251 is provided with a flange 254 which is located adjacent a flange 255 formed in the sleeve 244. This tubular member 251 constitutes the actuating part of the safety clutch while the sleeve 244 is the actuated part. The flange 254 is provided with a horizontal bore 256 in which is located a ball 257 which projects beyond the face of the flange and which normally rests within a depression 258 formed in the face of the flange 255.

The ball 257 is held in this normal position and in the depression 258 by a flange 259 formed on one end of a sleeve 261 loosely mounted on the tubular member 251. A spring 262 is positioned exteriorly of the sleeve 261 and is interposed between the flange 259 thereof and a clamping collar 263 held on the tubular member 251, this spring acting against the parts 259 and 261 to back up the ball 257. As long as the ball 257 remains in the depression 258, the parts 251 and 244 are locked together and the segmental gear 243 carried by the sleeve 244 moves with the shaft 245. While only a single ball 257 and a single depression 258 have been described and shown, it will be understood that several balls with a corresponding number of depressions may be used if desired.

One end of the shaft 245 extends beyond the bearing 247 and carries a split housing formed by side plates 275 and 276 (Figs. 1 and 6) mounted on the shaft and held together by a top plate 277. This housing encloses a gear 278 which is keyed to the shaft 245. The side plates 275 and 276 are slotted to allow passage of a rack bar 279 through the ends thereof, this rack bar 279 being provided with teeth 281 which mesh with the gear 278. The upper end of the rack bar is adjustably connected with a connecting rod 282 secured to a block 283 mounted on a bolt 284 projecting from the face of a hub 285 of a sprocket 286 mounted upon and turning with the crankshaft 35.

Rotation of the crankshaft 35 and corresponding rotation of the sprocket hub 285 carries the bolt 284 in a circular path raising and lowering the connecting rod 282 and sliding the rack bar 279 up and down within the side plates 275 and 276 of the housing. Inasmuch as these side plates are mounted directly on the shaft 245, they will oscillate on the shaft as the throw of the bolt 284 swings the connecting rod back and forth as well as up and down. This construction permits unrestricted sliding movement of the rack bar 279 as it turns the gear 278 and oscillates the shaft 245 back and forth.

This oscillatory movement of the shaft 245 is communicated by way of the safety clutch to the segmental gear 243 and the sliding member 231, carrying the feed dogs 235 back and forth. By such means the spout blank 215 is moved laterally from its position in alignment with the blanking station into the next adjacent station which is an idle station.

Figure 26:
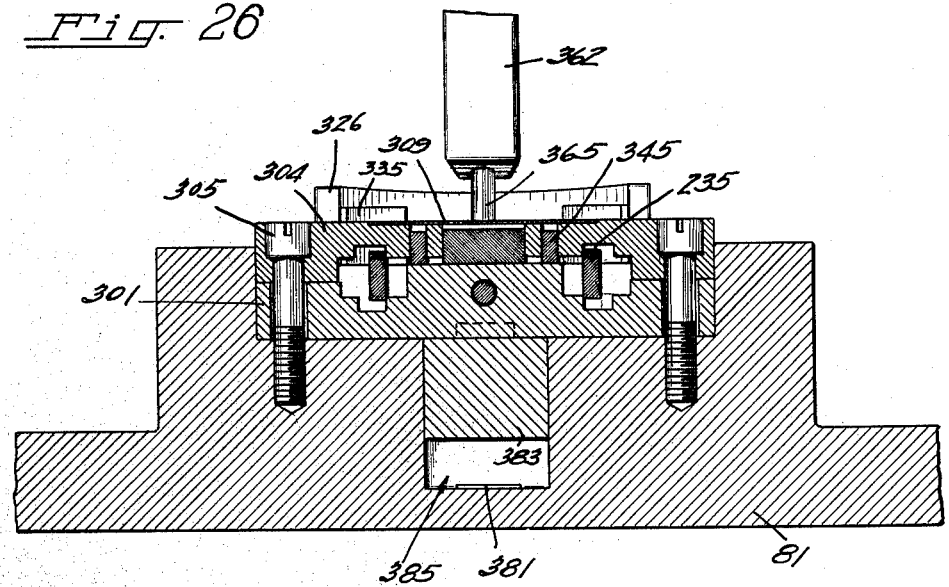
Fig. 26 is a transverse sectional view taken on the line 26—26 in Fig. 11.

In this movement the blank slides along the upper surface of a stationary plate 301 (Figs. 7, 11 and 12) which extends from a position to the rear of the blanking station to a position beyond the idle station and adjacent the next succeeding station, the spout forming station. The sliding member 231 passes beneath the plate 301, the raised sides 233 of the sliding member moving on opposite edges of the plate. The plate 301 at its forward end is formed with oppositely disposed extensions or ears 302 (Figs. 11 and 26), which are located in grooves 303 cut in the die shoe 81.

A clamping plate 304 (see also Fig. 8) is mounted at each side of the die shoe and within the groove 303 and rests directly upon one of the extensions 302. Both of the plates 304 and the extension 302 are clamped tightly in position on the die shoe by bolts 305. This construction rigidly holds the plate 301 in position with its rear end held solidly and its free end extending in the channel formed between the raised sides 233 of the sliding member 231. This guides the latter in its reciprocating feeding stroke.

The blank 215 at the idle station (Figs. 12 and 26) is held down on the plate 301 and the raised sides 233 of the member 231 by a spring held block 306. The under surface of the block 306 at its forward end is tapered as indicated by the numeral 307 to permit free passage of the advancing blank 215 therebeneath. The block 306 is loosely held in position by pins 308 extending upwardly therefrom, these pins passing through a top plate 309 (see also Fig. 8). The plate 309 is carried on the side plates 304 and bridges the opening between them.

One end of the block 306 projects within a slot 311 cut in the under surface of the die plate 202 adjacent one edge. Springs 312 are interposed between the plate 309 and the block 306 and yieldingly hold the same downwardly except at such time as a blank 215 engages and moves beneath the inclined wall 307 when the block 306 is lifted. The blank 215 at the idle station rests in a seat 313 formed on the under surface of the block 306 as illustrated in Fig. 12. As the sliding member 231 with its feed dogs 235 moves back on the return stroke, the block 306 prevents similar backward movement of the blank which remains in its seat 313 at the idle station.

On the next forward movement of the member 231, the forward feed dogs 235 engage behind the rear edge of the blank and move it into the forming station. During this movement the blank passes from beneath the block 306 and moves under a similar block 316 which has a tail part 317 extending under a front edge 318 of the block 306. The block 316 is also loosely mounted on the plate 309, pin 319 extending upwardly from the block passing through the plate. A spring 321 is interposed between the plate 309 and the block 316 and yieldingly holds the latter on the advancing blank 215. The under surface of the tail part 317 is tapered to permit proper passage of the blank therebeneath.

Figure 16:
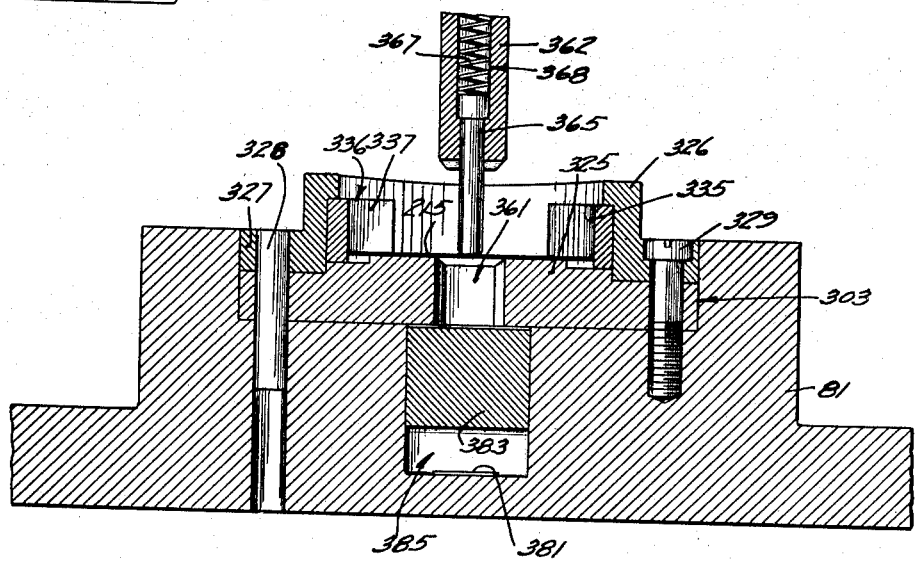
Fig. 16 is a transverse sectional view taken substantially along the broken line 16—16 in Fig. 11.
Figure 17:
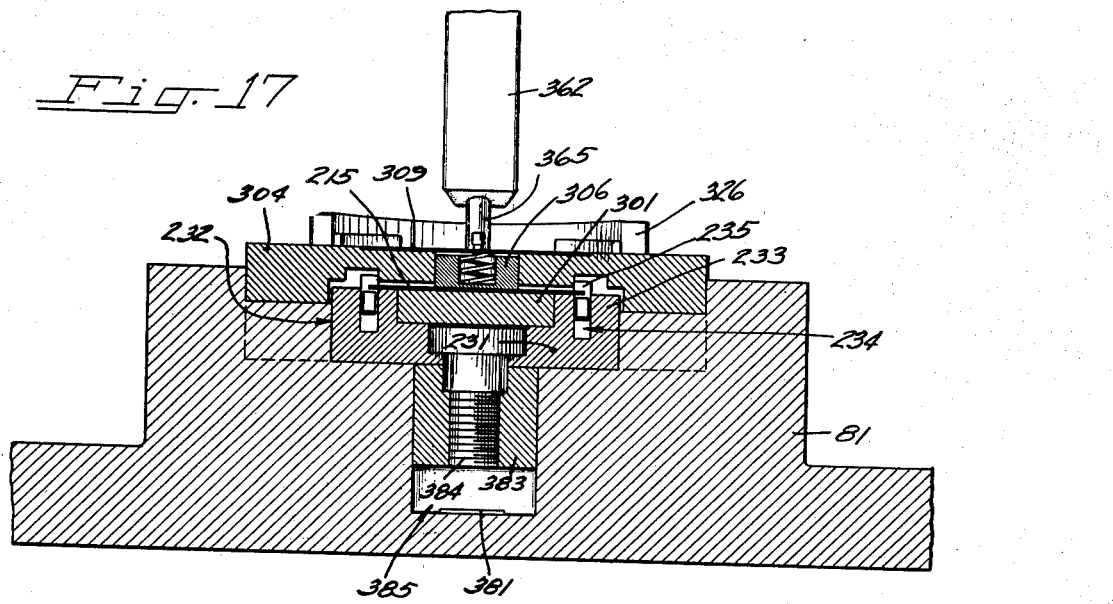
Fig. 17 is a transverse sectional view taken along the line 17—17 in Fig. 11.

At the spout forming station, the groove 303 formed in the die shoe 81 accommodates a die plate 325 (Figs. 8, 11 and 16). An end member 326, provided with opposite disposed flanges 327, is also located in the groove 303 and rests upon the die plate 325. Dowel pins 328 center the parts 325 and 326 and screws 329, passing through these parts and having threaded engagement with the die shoe 81, hold the parts in fixed position.

The advancing blank 215, reaching the forming station, comes into contact with certain yielding centering devices which comprises a pair of sliding fingers 335 (Figs. 9, 11, 12 and 16) which have sliding movement in channels 336 formed in the end member 326. An engaging face 337 of each finger 335 is rounded to fit the rounded edge $c$ of the blank 215. A spring 338 (Fig. 1) is located within a bore 339 formed in each finger 335 and extends outwardly into a similar bore 341 formed in a bar 342 secured to one edge of the end member 326, the bar being held by a screw 343.

This bringing of the blank into position at the forming station moves its rear edge just beyond a pair of spaced stop dogs 345 (Figs. 8, 9, 26 and 27) pivoted on pins 346 carried by the clamping plates 304, each dog moving in a slot 347 cut in the forward inner edge of the plate. A leaf spring 348 engages above each dog 345 and is secured, at one end, on the clamping plate by a screw 349. Slots 351 cut in the cover plate 309 allow for clearance of the springs 348. The blank 215 is thus accurately located in the spout forming station by the cooperation of the fingers 335 and the dogs 345, the fingers under action of their springs 338 holding against the two edges $c$ of the blank and the two opposite blank edges $a$ resting against the forward faces of the dogs.

The die plate 325 is slotted vertically at 361 (Figs. 11, 12 and 16) and the blank 215 while in the forming station is moved downwardly through this slot and is thereby bent along the dotted lines $f$ (Fig. 22), this bending action changing it from its flat condition into U-shaped and spout form. To effect such forming action, there is provided a forming punch member 362 (see also Figs. 7 and 27) having a lower end 363 shaped to conform to, although in dimension slightly smaller than the opening 361. This punch member 362 is carried by the punch block 88 and moves up and down with the slide 64.

A holding pin 365 having an enlarged head 366 forms a part of the punch or die and is located in the lower end of the punch member 362 and has sliding movement therein. A spring 367 is confined within a vertical bore 368 formed centrally of the punch member and its lower end engages the head 366 of the pin 365, its upper end resting against the punch block 88. As the punch member 362 descends in the forming operation, the projecting pin 365 engages the upper surface of the blank 215 (as illustrated in Fig. 12) and holds it in median position on the die plate 325 with one half of the blank at each side of the pin until the lower surface of the punch member 362 engages and moves the blank 215 downwardly, the spring 368 yielding to permit this engagement between the punch member and the blank.

The formed end 363 of the punch member 362 thus moves into the opening 361 carrying the spout blank therewith. During this initial movement of the parts into the position illustrated in Fig. 18, the outer ends of the blank 215 are bent upwardly to produce the side walls $g$ leaving the center part $h$ (Fig. 23) against the lower face of the punch member. The blank is then in U-shaped form.

Simultaneously with the forcing of the spout blank downwardly into the opening 361 of the die plate 325, the lug $e$ is bent along its dotted line $k$ by engagement with a hardened steel die 371 (Figs. 11, 12 and 18) inserted in the forward edge of the plate 301 and held in position by a screw 372. This lug $e$ is wiped against the face of the die 371 as the blank is forced downwardly through the opening in the die plate and is bent to a right angle position.

Figure 27:
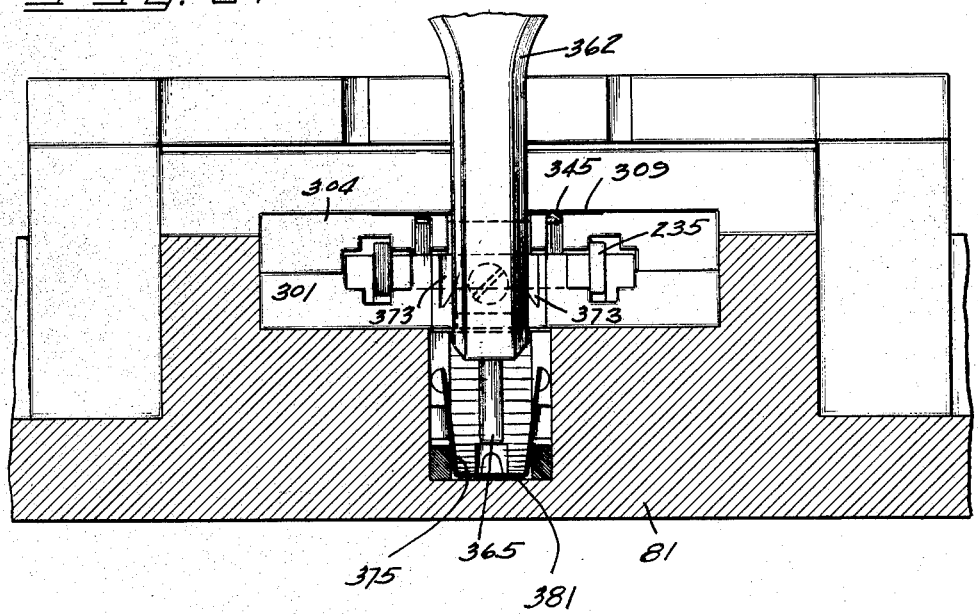
Fig. 27 is a transverse sectional view taken on the line 27—27 in Fig. 11.

With the blank in the position illustrated in Fig. 18, the lugs *b* thereof rest just above the die 371 and further downward movement of the punch member with the blank forces these lugs into the upper end of tapered vertical slots 373 formed in the face of the member 371 (see also Figs. 20 and 27). Further descent of the punch member and blank through the opening 361 carries the lugs *b* through the slots 373 bending them outwardly at substantially right angles to the side walls *g* along the dotted lines *j* as shown in Fig. 21. This lug forming action is completed as the lugs *b* leave the bottom ends of the slots 373 and move along the face of the member 371. A completely formed spout designated by the numeral 375 (Figs. 23, 24 and 25) is thus produced from the flat blank 215.

As soon as the spout is free from the side and end walls of the opening 361, the spring 367 forcibly projects the pin 365 outwardly, moving the formed spout 375 downwardly (Fig. 13), ahead of the descending punch member, and onto a blade 381 (Figs. 7, 11, 12, 13 and 17). This blade is secured by screws 382 to the forward end of a bar 383 secured by a screw 384 to the forward end of the sliding member 231.

This bar 383 and blade 381 move with the sliding member, the former sliding within a longitudinal channel 385 cut in the die shoe 81 directly beneath the groove 232. The bar 383 is utilized in discharging the formed spouts 375 from the apparatus, the delivered position of the spouts onto the blade 381 positioning them in front of the forward end of the bar 383.

When the bar 383 moves forward for a discharging operation, this being at the time subsequent blanks 215 are being advanced by the feeding member 231, two spaced projections 402 extending out from the forward end of the sliding member 231 engage the lugs *b* of the spout and the forward end of the bar 383 engages the lug *e*. The forward ends of the projections 402 are tapered to correspond with the angular position of the lugs as shown in Fig. 14. This forward movement of the bar begins while the punch member 362 is still moving upward and out of the space in front of the bar and clearance for the rising pin 365 is made possible by cutting away the forward upper end of the bar at 404, this being on an angle.

The advancing bar 383 carries the spout on the blade 381 and moves it between upwardly extending walls 405 (Figs. 11 and 19) of a channel 406 which is formed with projecting lugs 407 secured to the front edge of the die shoe 81 by means of bolts 408. Projecting edges 409 (see also Fig. 27) formed on the forward end of the bar 383 confines the side walls of the spout 375 during this travel.

As the spout 375, advanced by the bar 383, approaches the end of the feeding stroke, it passes under a tapered end 411 of a retaining strap 412 (Figs. 2 and 19) suspended by bolts 413 from bars 414 resting on the side walls 405. The bolts 413 loosely rest in vertical bores formed in the bars and each bolt is surrounded by a spring 415 interposed between the lower surface of the bar 414 and the upper surface of the strap 412. The strap is thus yieldingly held in position.

The tapered end 411 of the strap 412 terminates in a hooked projection 416 which falls behind the lug *e* of the advancing spout 375 after the latter has lifted and moved under the strap. The hooked end 416 prevents backward movement of the spout 375 with the return movement of the blade 381 and the feeding device. Each advancing spout 375, moving into position under the bar 412 pushes forward the other spouts previously brought into place and advances them step by step along the channel 406 and out of the machine.

The skeleton end of the strip 91, after a blank 215 has been removed at the blanking station, advances with each intermittent movement of the feed rollers 121 and 122 to a position where the extreme end portion thereof is cut off. To effect such cutting, the forward edge of the die plate 202 is utilized as a cutting element, and cooperating therewith is a shear blade 421 (Figs. 1 and 7) which is mounted in a block 422 and held in position by a screw 423. The block 422 is secured to the punch block 88 by a screw 424, this block being located intermediate the members 211 and 362. At each downward stroke of the punch block, the shear blade 421 engages the end of the strip 91 and, cooperating with the die plate 202, severs a skeleton waste piece therefrom. This waste piece is designated by the numeral 425 (see also Fig. 2).

The waste piece 425 falls upon a belt 426 (Figs. 2, 6 and 7) which moves across the die shoe 81 and parts carried thereby. This belt 426 is carried by a series of pulleys, the belt passing in a horizontal plane across the apparatus when discharging the waste pieces 425.

The belt 426 passes over a pulley 427 which is mounted on a shaft 428 journaled in bearings 429 carried by a bracket 431 secured at one side of the table 44. The shaft 428 has mounted on one end a frame 432 which has free movement on the shaft being held against displacement by a collar 433 pinned to the shaft, a similar collar 434 also pinned to the shaft being used on the opposite end of the shaft.

The frame 432 supports a shaft 435 on which is rotatably mounted a pulley 436 which also carries the belt 426. The pulley 436 is normally held outwardly by a spring 437 interposed between an arm 438 of the frame 432 and a lug 439 projecting outwardly from the bracket 431. This yielding mounting of the frame 432 and pulley carried thereby act as a belt tightener.

The belt 426 extends from the pulley 436 under the table 44 and partially around a pulley 441 rotatably mounted on a shaft 442 carried in a frame 443 secured by bolts 444 to the opposite side of the table 44. The belt thence passes behind a pulley 445 rotatably mounted on a shaft 446 carried by the frame 443 and thence over a pulley 447 secured to a shaft 448 also journaled for rotation in the frame 443.

The belt 426 and its supporting pulleys 427, 436, 441, 445 and 447 are continually driven by connection with the crankshaft 35 and reference should now be had to Figs. 1, 2 and 6. The shaft 448 carries at its end a bevel gear 455 which meshes with a pinion 456 secured to a cross shaft 457 mounted in bearings 458 formed in bracket extensions 459 of the frame 443. Shaft 457 also carries a sprocket 461 over which operates a chain 462 passing upwardly and over the sprocket 286 carried on the crankshaft 35.

A chain tightener device is used with this chain, which comprises a sprocket 463 rotatably mounted on a shaft 464 carried on one arm of a lever 465 pivotally mounted on a bolt 466 carried by a bracket 467 secured to one of the side walls 33. The sprocket 463 is positioned to tighten the chain 462 by pivotal action of the lever 465 on its bolt 466, a lug 468 formed in the lever engaging a setscrew 469 for this purpose. The setscrew 469 is threadedly engaged in a projection 471 formed in the bracket 467, a locknut 472 being threadedly secured on the setscrew to clamp it in adjusted position.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for making pouring spouts of substantially U-shape, having in combination a cutting station having dies for severing a spout blank of elongated form from a strip of metal, and feeding devices for advancing a strip of material to said dies in a direction oblique to the length of the blank to be produced whereby the width of the sheet metal, for purposes of cutting, is elongated at the cutting station, means for propelling the individual blanks after they are cut, and dies for bending said blank to substantially U-form to produce a pouring spout.

2. An apparatus for making pouring spouts comprising, in combination feeding devices for advancing a strip of sheet material to a cutting station, means located at said station for severing an elongated spout blank from said strip, means for propelling the individual blanks, friction means for holding the blanks while propelled, and means for bending the median portion of said blank to produce a U-shaped pouring spout.

3. An apparatus for making pouring spouts comprising, in combination, feeding devices for advancing a strip of sheet material to a cutting station, means located at said station for severing a spout blank from said strip, transferring devices for moving said spout blank from said cutting station to a bending station, and means located at said bending station comprising a die having opposite walls inclined to each other engaging the middle of the blank and a fixed die having inclined side walls engaging the end portions of the blank for and cooperating with the first mentioned inclined walls for bending the middle of said blank to produce a pouring spout having walls on three sides and three open sides.

4. An apparatus for making pouring spouts having walls on three sides and three open sides comprising, in combination, a pair of feeding rollers for advancing a strip of sheet material to a cutting station, means located at said station for severing a spout blank from said strip, devices associated with said cutting means for intermittently rotating said feeding rollers to advance said strip, means for interrupting the advance of said strip, and dies engaging the middle portion and end portions of the blank, respectively, said dies having walls inclined to each other and shaped to bend the said end portions at angles to said middle portion at an angle to each other.

5. An apparatus for making pouring spouts comprising, in combination, feeding devices for advancing a strip of sheet material to a cutting station, means located at said station for severing a spout blank from said strip, while producing a skeleton end on said strip, shearing means at said station for removing said skeleton end, and dies having bottom walls and opposing flat side walls for forming pouring spouts of U-shape having three walls and three open sides.

6. An apparatus for making pouring spouts comprising, in combination, feeding devices for advancing a strip of sheet material to a cutting station, means located at said station for severing a spout blank from said strip, while producing a skeleton end on said strip, shearing means at the cutting station for removing a part of said strip end by cutting of a scrap piece therefrom, devices for discharging said scrap piece from the apparatus, and dies having bottom walls and opposing flat side walls for forming pouring spouts of U-shape having three walls and three open sides.

7. An apparatus for making pouring spouts comprising, in combination, means located at a cutting station for severing a spout blank from a strip of sheet material, transferring devices for moving said spout blank from said cutting station to a bending station, dies at said bending station shaped to form said spout blank into a pouring spout having ends at angles to its middle portion, one of said dies having a spring-actuated holding pin, instrumentalities for actuating said transferring devices, and a safety clutch device interposed between said transferring devices and said actuating instrumentalities for preventing movement of the former in the event of an obstruction to the feeding of said spout blanks.

8. An apparatus for making pouring spouts comprising, in combination, transferring devices for moving a cut spout blank into a bending station, a stationary die having two walls located at said station, a fixed die member having lug-forming face, a movable die member located at said station and having two opposed flat walls and adapted to cooperate with said stationary die and between said walls, devices located adjacent said station for centering said spout blank in said dies, and means for actuating said dies to bend said spout blank into pouring spout form of substantially U-shape and provided with outwardly turned lugs.

9. An apparatus for making pouring spouts comprising, in combination, transferring devices for moving a cut spout blank into a bending station, a stationary die having two walls located at said station, a fixed die member having lug-forming faces, a movable die member located at said station and adapted to cooperate with said stationary die and between said walls, devices located adjacent said station for centering said spout blank in said dies, means for actuating said dies to bend said spout blank between said walls into pouring spout form of substantially U-shape having three walls and three open sides and outwardly turned lugs, and a knockout pin carried in one of said dies for discharging the formed pouring spout from said dies.

JOHN M. HOTHERSALL.